United States Patent
Dai et al.

(10) Patent No.: US 11,295,550 B2
(45) Date of Patent: Apr. 5, 2022

(54) IMAGE PROCESSING METHOD AND APPARATUS, AND TERMINAL DEVICE

(71) Applicant: Goertek Inc., Weifang (CN)

(72) Inventors: Tianrong Dai, Weifang (CN); Yuge Zhu, Weifang (CN); Dachuan Zhao, Weifang (CN); Xiang Chen, Weifang (CN)

(73) Assignee: GOERTEK INC.

( * ) Notice: Subject to any disclaimer, the term of this patent is extended or adjusted under 35 U.S.C. 154(b) by 178 days.

(21) Appl. No.: 16/461,718

(22) PCT Filed: Jun. 26, 2018

(86) PCT No.: PCT/CN2018/092887
§ 371 (c)(1),
(2) Date: May 16, 2019

(87) PCT Pub. No.: WO2019/041992
PCT Pub. Date: Mar. 7, 2019

(65) Prior Publication Data
US 2021/0374390 A1 Dec. 2, 2021

(30) Foreign Application Priority Data
Aug. 30, 2017 (CN) .......................... 201710766169.1

(51) Int. Cl.
*G06V 40/16* (2022.01)
*G06T 5/00* (2006.01)
*G06T 5/50* (2006.01)

(52) U.S. Cl.
CPC ............ *G06V 40/174* (2022.01); *G06T 5/001* (2013.01); *G06T 5/50* (2013.01); *G06V 40/171* (2022.01); *G06T 2207/20084* (2013.01)

(58) Field of Classification Search
CPC ............ G06K 9/00302; G06K 9/00281; G06T 5/001; G06T 5/50; G06T 2207/20084
See application file for complete search history.

(56) References Cited

U.S. PATENT DOCUMENTS 10,445,863 B2 * 10/2019 Grassinger ............. G02B 27/01
2011/0317905 A1 12/2011 Sam
(Continued)

FOREIGN PATENT DOCUMENTS

CN 104539868 A 4/2015
CN 106170083 A 11/2016
(Continued)

*Primary Examiner* — Wesley J Tucker
(74) *Attorney, Agent, or Firm* — Clark Hill PLC; James R. Foley

(57) ABSTRACT

An image processing method comprises: acquiring an actual image of a specified target from a video stream collected by a camera; identifying an area not shielded by the VR HMD and an area shielded by the VR HMD of the face of the specified target from the actual image, and acquiring first facial image data corresponding to the area not shielded; obtaining second facial image data matching the first facial image data according to the first facial image data and a preset facial expression model, wherein the second facial image data correspond to the area shielded; and fusing the first facial image data and the second facial image data to generate a composite image. An image processing device comprises a first acquiring unit, an identifying unit, a second acquiring unit and a generating unit, and is for performing the steps of the method described above.

12 Claims, 2 Drawing Sheets

(56) References Cited

U.S. PATENT DOCUMENTS

| | | | |
|---|---|---|---|
| 2016/0140761 A1 | 5/2016 | Saunders et al. | |
| 2016/0216760 A1* | 7/2016 | Trutna | G06F 3/015 |
| 2016/0217621 A1* | 7/2016 | Raghoebardajal | G06T 19/006 |
| 2016/0341959 A1* | 11/2016 | Gibbs | A63F 13/212 |
| 2017/0243387 A1* | 8/2017 | Li | G06K 9/00281 |
| 2017/0287194 A1* | 10/2017 | Katz | G06F 3/012 |
| 2018/0101989 A1* | 4/2018 | Frueh | G06K 9/00255 |
| 2018/0158246 A1* | 6/2018 | Grau | G02B 27/0093 |

FOREIGN PATENT DOCUMENTS

| | | |
|---|---|---|
| CN | 107004296 A | 8/2017 |
| CN | 107004301 A | 8/2017 |
| CN | 107305621 A | 10/2017 |
| CN | 107491165 A | 12/2017 |
| CN | 107680069 A | 2/2018 |
| JP | 11-96366 A | 4/1999 |

* cited by examiner

IMAGE PROCESSING METHOD AND APPARATUS, AND TERMINAL DEVICE

CROSS REFERENCE TO RELATED APPLICATIONS

This application is a U.S. National Stage entry under 35 U.S.C. § 371 based on International Application No. PCT/CN2018/092887, filed on Jun. 26, 2018, which was published under PCT Article 21(2) and which claims priority to Chinese Patent Application No. 201710766169.1, filed on Aug. 30, 2017. The embodiment of the priority applications are hereby incorporated herein in their entirety by reference.

TECHNICAL FIELD

The present disclosure relates to the technical field of computers, and more specifically to an image processing method and an image processing apparatus, and a terminal device.

BACKGROUND

An important application area of virtual reality (VR) technology is the social field. For example, in the VR video live broadcast application, a 360-degree camera is provided on the host side, a full-view scene video of the live broadcast site is collected and shared with a VR head-mounted display or head-mounted device (HMD) of the access terminal via a network, and a visitor experiences the scene video on the host side by wearing the VR HMD and can watch the scenes of different viewing angles by turning his/her head. The feature of this application is that the VR video data stream is transmitted unidirectionally. As the demand on VR socializing grows, VR socializing requires bidirectional flowing of the VR video data stream between the two points; in other words, both of the social participants must be provided with a 360-degree camera and a VR HMD at the same time to collect the local full-view video and send it to the other social participant, and the other social participant watches it from the VR HMD.

However, since both of the social participants wear the VR HMD, the face collected by the local camera will be shielded by the VR HMD at the eyes and the surrounding area. The image around the eyes has very rich facial expression information, the lack of which will seriously affect the application of VR technology in the social field. Therefore, an image processing solution is urgently needed to reconstruct the eyes and the surrounding area that are shielded by the VR HMD to ensure the integrity of the facial expression information in the socializing process.

SUMMARY

In view of the above problems, the present disclosure provides an image processing method and apparatus and a terminal device to solve or at least partially solve the above problems.

An aspect of the present disclosure provides an image processing method, comprising: acquiring an actual image of a specified target from a video stream collected by a camera, wherein the specified target wears a VR HMD;

identifying an area not shielded by the VR HMD and an area shielded by the VR HMD of the face of the specified target from the actual image, and acquiring first facial image data corresponding to the area not shielded by the VR HMD;

obtaining second facial image data matching the first facial image data according to the first facial image data and a preset facial expression model, wherein the second facial image data correspond to the area shielded by the VR HMD; and fusing the first facial image data and the second facial image data to generate a composite image.

Another aspect of the present disclosure provides an image processing apparatus, comprising:

a first acquiring unit, for acquiring an actual image of a specified target from a video stream collected by a camera, wherein the specified target wears a VR HMD;

an identifying unit, for identifying an area not shielded by the VR HMD and an area shielded by the VR HMD of the face of the specified target from the actual image, and acquiring first facial image data corresponding to the area not shielded by the VR HMD;

a second acquiring unit, for obtaining second facial image data matching the first facial image data according to the first facial image data and a preset facial expression model, wherein the second facial image data correspond to the area shielded by the VR HMD; and a generating unit, for fusing the first facial image data and the second facial image data to generate a composite image.

Still another aspect of the present disclosure provides a terminal device comprising an image processing apparatus as described above.

In sum, the advantageous effects of the technical solutions of the present disclosure are as follows. When an actual image of a specified target wearing a VR HMD is acquired, first, an area not shielded by the VR HMD and an area shielded by the VR HMD of the face of the specified target are identified from the actual image, and the first facial image data corresponding to the area not shielded by the VR HMD are inputted into the preset facial expression model, and thus the second facial image data matching the first facial image data are obtained; and then, the first facial image data and the second facial image data are fused to generate a composite image. Since the second facial image data correspond to the area shielded by the VR HMD and include facial expression information, the composite image is an integral image with facial expression information. Compared with using a static image, the composite image is more realistic and accurate, so the social participating parties can obtain the facial expression information of the other social participant in time, thereby improving the socializing quality, ensuring a smooth process of socializing, and enhancing the user experience.

DETAILED DESCRIPTION

The inventive concept of the present disclosure is as follows. If a static picture of the eyes is used to cover the portion shielded by the VR HMD, the problem of the lack of the facial expression information still remain unsolved, and the static picture and the rest of the face cannot be perfectly fused, which will make the fused image unnatural. It should also be noted that there is a strong correlation between the image of the eyes and the surrounding area of the face that are shielded by the VR HMD and the image information of the face that is not shielded by the VR HMD. Thus, in the present disclosure, a facial expression model is introduced, and a facial image of the shielded area that matches the information of the facial image that is not shielded by the VR HMD is obtained by the facial expression model, thereby obtaining a composite image with full facial expression information.

In order to make the objectives, technical solutions and advantages of the present disclosure clearer, the embodiments of the present disclosure will be further described in detail below with reference to the accompanying drawings.

Figure 1:
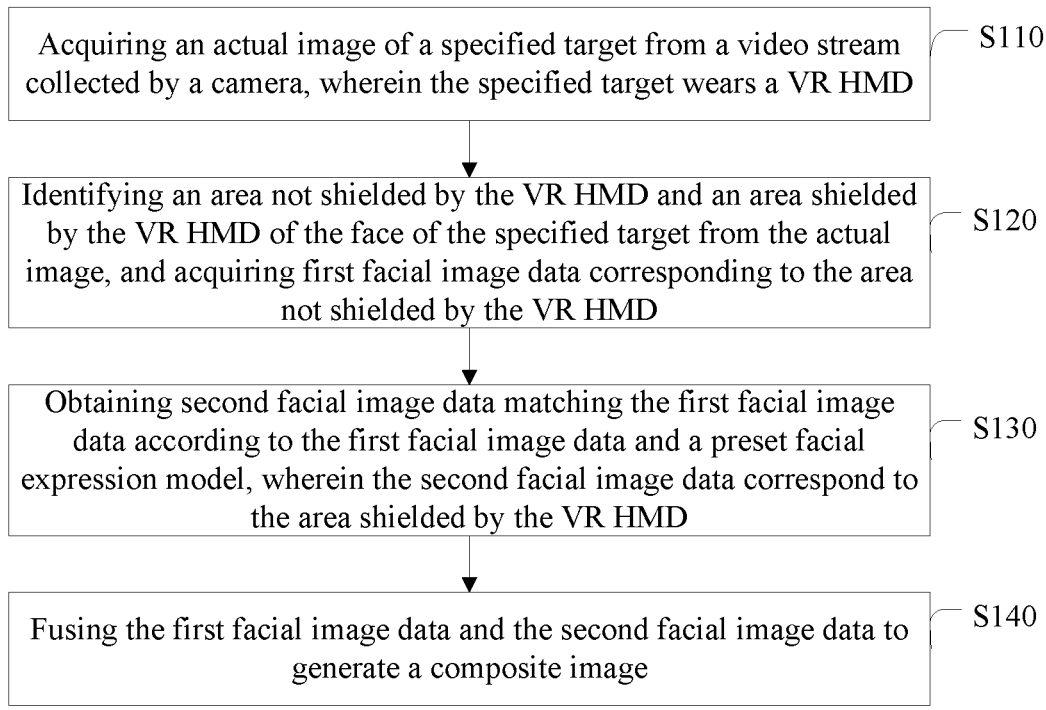
FIG. 1 is a schematic flow diagram of an image processing method according to an embodiment of the present disclosure.

FIG. 1 is a schematic flow diagram of an image processing method according to an embodiment of the present disclosure. As shown in FIG. 1, the image processing method comprises:

Step S110: acquiring an actual image of a specified target from a video stream collected by a camera, wherein the specified target wears a VR HMD.

In the present embodiment, the camera is provided at a location that can collect the image of the specified target. The camera may be an independent camera or a camera installed on a terminal device, provided that the apparatus implementing the method can acquire the video stream collected by the camera. In social applications, the social participants include a user A and a user B, and they both wear a VR HMD and are provided with a camera. The cameras can collect video streams including the user A and the user B respectively. For example, the camera provided on the user A side can collect a video stream including the user A, and the camera provided on the user B side can collect a video stream including the user B. In the present embodiment, the method is described from the angle of view of one social participant. For example, if seen from the user A side, the camera collects a video stream of a specified target (the user A) and transmits it to the other social participant (the user B). In the present embodiment, the specified target may be a user who is wearing a VR HMD and socializing. As the specified target wears the VR HMD, in the actual image, the eyes and the surrounding area of the eyes of the face of the specified target are shielded by the VR HMD, and full facial expression information cannot be acquired, which will affect the socializing process. In order to process the image collected by the camera, an actual image of a specified target must be acquired from the video stream collected by the camera.

Step S120: identifying an area not shielded by the VR HMD and an area shielded by the VR HMD of the face of the specified target from the actual image, and acquiring first facial image data corresponding to the area not shielded by the VR HMD.

In the present embodiment, an image identification method is used to identify the face of the specified target in the actual image, and identify an area not shielded by the VR HMD and an area shielded by the VR HMD. Since the image data corresponding to the area shielded by the VR HMD must be obtained from the area not shielded by the VR HMD, it is necessary to acquire the first facial image data of the identified area not shielded by the VR HMD from the actual image.

Step S130, obtaining second facial image data matching the first facial image data according to the first facial image data and a preset facial expression model, wherein the second facial image data correspond to the area shielded by the VR HMD.

In the present embodiment, the preset facial expression model is obtained by training samples of the specified target, for example, by using a neural network for machine learning, and the relation between the image data of the area not shielded by the VR HMD and the image data of the area shielded by the VR HMD can be obtained in the sample training. Therefore, according to the first facial image data acquired from the actual image and the preset facial expression model, the second facial image data matching the first facial image data can be obtained; in other words, the image data corresponding to the area shielded by the VR HMD can be obtained.

For a user, the sample training only needs to be done once. However, when the user replaces the VR HMD, since the sizes of the VR HMDs before and after the replacement may be not the same, retraining is required, to avoid that the second facial image data generated by the original preset facial expression model cannot fuse with the first facial image data perfectly.

Step S140, fusing the first facial image data and the second facial image data to generate a composite image.

The first facial image data and the second facial image data are fused by an image fusion method to generate a composite image. Because the second facial image data are an image with the facial expression information corresponding to the area shielded by the VR HMD, the composite image includes a full facial expression of the specified target. Once the composite image is obtained, it may be sent from the social participant to the other social participant.

Since the second facial image data correspond to the area shielded by the VR HMD and include facial expression information, the composite image is an integral image with facial expression information. Compared with the composite image obtained by fusing with a static image without the facial expression information, the composite image of the present embodiment is more realistic and accurate, so the social participating parties can obtain the facial expression information of the other social participant in time, thereby improving the socializing quality, ensuring a smooth process of socializing, and enhancing the user experience.

In an embodiment of the present disclosure, in step S130, the step of obtaining second facial image data matching the first facial image data according to the first facial image data and a preset facial expression model comprises: inputting the first facial image data into the preset facial expression model so that the facial expression model identifies the first facial image data, and outputs the second facial image data matching the first facial image data.

As described above, in the preset facial expression model, there is a relationship between the image data of the area not shielded by the VR HMD and the image data of the area shielded by the VR HMD, so when the first facial image data are inputted into the preset facial expression model, the facial expression model identifies the first facial image data, and outputs the second facial image data matching the first facial image data. In other words, the preset facial expression model will automatically analyze the first facial image data, and then directly generate the second facial image data matching the first facial data according to the first facial image data, thereby improving the efficiency of image processing and further enhancing the user experience.

Further, the preset facial expression model is obtained by using a deep neural network, and the step of obtaining the preset facial expression model by using a deep neural network comprises:

(1) acquiring a plurality of first sample images of the specified target collected by the camera in a first scene, and a plurality of second sample images of the specified target collected in a second scene; wherein in the first scene, the specified target wears the VR HMD; and in the second scene, the specified target does not wear the VR HMD, and each of the second sample images contains a facial expression of the specified target.

In the present embodiment, the purpose of acquiring a plurality of first sample images is to extract the portions of the second sample images that are corresponding to the area shielded by the VR HMD. For example, if the area shielded by the VR HMD is the eye area, the eye areas in the second sample images must be extracted. The plurality of second sample images should contain various facial expression information of the user so that when the actual image is processed, more accurate second image data can be matched.

(2) identifying a first shielded area from the first sample images, and acquiring information of the first shielded area.

As described above, in order to extract the portions of the second sample images that are corresponding to the area shielded by the VR HMD, it is necessary to identify the first shielded area in the first sample images, and then acquire the information of the first shielded area, for example, coordinate information of the area boundary.

(3) marking an area of the face of the specified target in the second sample images that is corresponding to the first shielded area according to the information of the first shielded area, and obtaining a marked area.

Here, the marked area obtained is the area the same as the area shielded by the VR HMD in the first sample images, the image elements of the marked area are equivalent to those of the shielded area when it is in the unshielded state, and the marked area includes the facial expression information of the specified target. For example, if the first shielded area is the eye area, when the faces of the specified target in the second sample images are marked, the eye areas of the face of the specified target in the second sample images will be marked.

(4) placing images of the marked area in the second sample images into a first specified set that is used as an output set in deep neural network training, and placing images of the unmarked area of the face of the specified target in the second sample images into a second specified set that is used as an input set in the deep neural network training. Wherein the images placed into the first specified set serves as the image elements in the output set, the images placed into the second specified set serves as the image elements in the input set, and there is a one-to-one and input-output correspondence between image elements in the second specified set and image elements in the first specified set. In other words, the two image elements (one image element is an image element in the first specified set, and the other image element is an image element in the second specified set) having the one-to-one correspondence come from the same second sample image. For example, if the image element in the second specified set is an image element of the eye area from a sample image No. 1, the image element in the first specified set corresponding to it one-to-one is an image element of the non-eye area from the sample image No. 1.

(5) inputting each pair of the image elements into a preset deep neural network for training, wherein one image element of this pair is from the input set and the other is from the output set and the two elements of this pair have an input-output correspondence; determining a functional relation between an image of the unshielded area and an image of the shielded area that is generated to match the image of the unshielded area, so that when the first facial image data are inputted into the preset facial expression model, the preset facial expression model outputs the second facial image data matching the first facial image data according to the inputted first facial image data and the functional relation.

In the present embodiment, each pair of the image elements in the input set and the output set having an input-output correspondence is input into a preset deep neural network for training, because the image elements in the input set are the image elements of the unmarked area in the second sample image which are equivalent to the image elements of the unshielded area, while the image elements in the output set are the image elements of the marked area which are corresponding to the image elements in the input set one-to-one and are equivalent to the image elements of the shielded area when it is in the unshielded state. Therefore, after training in the preset deep neural network, a functional relation between the image of the shielded area when it is in the unshielded state and the image of the unshielded area can be obtained.

In a particular example, if the shielded area in the first sample image is the eye area, the image elements in the input set are the image elements of the non-eye area in the second sample image, while the image elements in the output set are the image elements of the eye area when it is in the unshielded state in the second sample image. After training in the preset deep neural network, a functional relation between the image elements of the eye area when it is in the unshielded state and the image elements of the non-eye area can be obtained.

The functional relation obtained above is the functional relation between the image of the unshielded area and the image of the shielded area that is generated to match it. When the image of the unshielded area is determined, the image of the shielded area matching the image of the unshielded area can be generated according to the functional relation. When the video stream collected by the camera is acquired, an actual image of a specified target in the video stream is determined. The unshielded area of the face of the specified target is identified from the actual image. The image data of the shielded area matching the unshielded area can be generated according to the functional relation obtained above. A composite image can be generated by fusing the image of the unshielded area and the obtained image data of the shielded area. The composite image is an integral facial image of the specified target, and is an unshielded facial image.

In the present embodiment, a deep neural network is designed, in which the type, the number of layers, and the numbers of the nodes in each layer are set according to the image resolution and the generation effect required. A machine learning method using a deep neural network is used to obtain the facial expression model of the specified target by performing machine learning on the sample images of the specified target.

Moreover, in the present embodiment, there is a one-to-one and input-output correspondence between image elements in the second specified set and image elements in the first specified set. In other words, in the present embodiment, a supervised training is performed by using the deep neural network, and the image elements having the input-output correspondence are inputted into the deep neural network for training to generate neural network model parameters. Since the inputted image elements and the outputted image elements having the correspondence, the functional relation output=f(input) between the image of the unshielded area and the image of the shielded area that is generated to match it can be generated through training, wherein the input is the image of the unshielded area of the face, and the output is the generated image of the eyes and the surrounding area corresponding to the facial image of the shielded area.

Thus, in the present embodiment, the machine learning method of the deep neural network is introduced to train the sample images of the specified target, and thus the image data of the area shielded by the VR HMD is generated by using the artificial intelligence to train-predict the sample images of the specified target. Thereby, the composite image can more closely match the specified target, the generated composite image can be more natural, and the user experience is enhanced.

The loss function is a crucial part in machine learning and optimization, and can evaluate the prediction ability of the model based on the prediction results. In practical applications, the choice of loss function is limited by many factors such as the existence of abnormal values, the selection of machine learning algorithms, the time complexity of gradient descent, the difficulty in taking derivatives, and the confidence of the prediction values. Thus, the most fit loss functions for the data of different types are also different. In the present embodiment, in a process of the preset deep neural network training, a loss function of the preset deep neural network training is a mean square error between images in the output set and images generated to match the images in the input set.

In the present embodiment, there is a one-to-one correspondence between the image elements in the input set and the image elements in the output set. After the functional relation is determined, an image matching the image elements in the input set is generated based on the image elements in the input set and the determined functional relation, and the loss function is the mean square error between the image elements in the output set and the actually generated image matching the image elements in the input set. For example, there is a one-to-one correspondence between the image elements 1, 2, 3 in the input set and the image elements 4, 5, 6 in the output set. Image elements 7, 8, 9 matching the image elements 1, 2, 3 are actually generated based on the determined functional relation and the image elements 1, 2, 3. Thus the loss function is the mean square error between the image elements 4 and 7, between the image elements 5 and 8, and between the image elements 6 and 9.

In practical applications, the VR HMD is larger than the face of the specified target. In addition to the part of the face area of the specified target, the VR HMD also shields part of the non-facial area. If only the face image is processed, the difference between the generated composite image and the real effect is large, so it is necessary to perform de-occlusion processing on the non-facial image shielded by the VR HMD, which can be performed by the following method:

(1) In an embodiment of the present disclosure, the method shown in FIG. 1 further comprises: identifying a non-facial area shielded by the VR HMD from the actual image; acquiring a plurality of third images before the actual image from the video stream, extracting a background image from the third images, and performing de-occlusion processing on the non-facial area shielded by the VR HMD by using image data corresponding to the non-facial area shielded by the VR HMD in the background image.

Here, the number of the third images is not specifically limited. Since the position of the camera collecting the video stream is relatively fixed with respect to the environment, the de-occlusion processing may be performed according to the background image information in the plurality of image frames before the actual image.

(2) In another embodiment of the present disclosure, the method shown in FIG. 1 further comprises: identifying non-facial image data shielded by the VR HMD from the actual image, inputting the non-facial image data into a preset non-facial model, so that the preset non-facial model identifies the non-facial image data and outputs fourth image data matching the non-facial area shielded by the VR HMD, and performing de-occlusion processing on the non-facial area shielded by the VR HMD according to the fourth image data.

In the present embodiment, the preset non-facial model may be generated by a neural network for unsupervised training. The de-occlusion processing may use an image fusion method to fuse the acquired image data or the fourth image data corresponding to the non-facial area shielded by the VR HMD with the image data of the area not shielded by the VR HMD in the actual image.

The de-occlusion processing is performed on the non-facial image shielded by the VR HMD by the above methods (1) and (2), to avoid that after the first facial image data and the second facial image data are fused, the connection part between the fused image data and the non-facial area is too obvious. Therefore, the generated composite image can be more realistic and integral, rather than merely embodying the facial expression information of the specified target, the entire composite image is more visually appealing, and the user experience is enhanced.

In an embodiment of the present disclosure, in practical applications, in the image processing method, the first facial image data, the second facial image data, the image data of the non-facial area unshielded by the VR HMD, and the acquired image data or the fourth image data corresponding to the non-facial area shielded by the VR HMD are fused to generate an integral composite image.

For example, in the present embodiment, the non-facial image data shielded by the VR HMD may be an area such as hair or ear of a specified target. The shielded hair or ear can be displayed by the above method (1) or (2), so that the generated composite image is more realistic.

Figure 2:
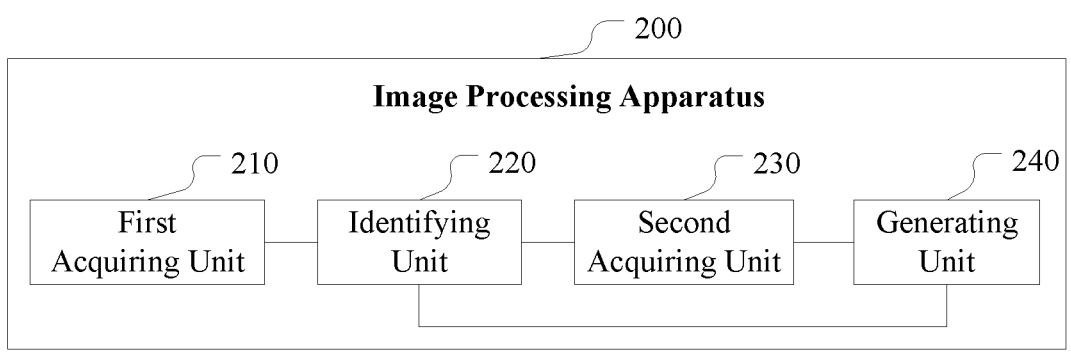
FIG. 2 is a schematic diagram of the functional structure of an image processing apparatus according to an embodiment of the present disclosure.

FIG. 2 is a schematic diagram of the functional structure of an image processing apparatus according to an embodiment of the present disclosure. As shown in FIG. 2, the image processing apparatus 200 comprises:

a first acquiring unit 210, for acquiring an actual image of a specified target from a video stream collected by a camera, wherein the specified target wears a VR HMD;

an identifying unit 220, for identifying an area not shielded by the VR HMD and an area shielded by the VR HMD of the face of the specified target from the actual image, and acquiring first facial image data corresponding to the area not shielded by the VR HMD;

a second acquiring unit 230, for obtaining second facial image data matching the first facial image data according to the first facial image data and a preset facial expression model, wherein the second facial image data correspond to the area shielded by the VR HMD; and a generating unit 240, for fusing the first facial image data and the second facial image data to generate a composite image.

In an embodiment of the present disclosure, the second acquiring unit 230 is for inputting the first facial image data into the preset facial expression model so that the facial expression model identifies the first facial image data, and outputs the second facial image data matching the first facial image data.

In an embodiment of the present disclosure, the second acquiring unit 230 further comprises a training module, the training module is for obtaining the preset facial expression model by using a deep neural network, and the training module is further for:

acquiring a plurality of first sample images of the specified target collected by the camera in a first scene, and a plurality of second sample images of the specified target collected in a second scene, wherein in the first scene, the specified target wears the VR HMD; and in the second scene, the specified target does not wear the VR HMD, and each of the second sample images contains a facial expression of the specified target;

identifying a first shielded area from the first sample images, and acquiring information of the first shielded area;

marking an area of the face of the specified target in the second sample images that is corresponding to the first shielded area according to the information of the first shielded area;

placing images of the marked area in the second sample images into a first specified set that is used as an output set in deep neural network training, and placing images of the unmarked area of the face of the specified target in the second sample images into a second specified set that is used as an input set in the deep neural network training, wherein there is a one-to-one and input-output correspondence between image elements in the second specified set and image elements in the first specified set; and inputting each pair of the image elements into a preset deep neural network for training, wherein each pair of the image elements is from the input set and the output set and the pair has an input-output correspondence, determining a functional relation between an image of the unshielded area and an image of the shielded area that is generated to match the image of the unshielded area, so that the second acquiring unit inputs the first facial image data into the preset facial expression model, and the preset facial expression model outputs the second facial image data matching the first facial image data according to the inputted first facial image data and the functional relation.

Further, in a process of the preset deep neural network training, a loss function of the preset deep neural network training is a mean square error between images in the output set and images generated to match the images in the input set.

In an embodiment of the present disclosure, the image processing apparatus 200 shown in FIG. 2 further comprises:

a processing unit, for identifying a non-facial area shielded by the VR HMD from the actual image; and acquiring a plurality of third images before the actual image from the video stream, extracting a background image from the third images, and performing de-occlusion processing on the non-facial area shielded by the VR HMD by using image data corresponding to the non-facial area shielded by the VR HMD in the background image.

In an embodiment of the present disclosure, the image processing apparatus 200 shown in FIG. 2 further comprises:

a processing unit, for identifying non-facial image data shielded by the VR HMD from the actual image, inputting the non-facial image data into a preset non-facial model, so that the preset non-facial model identifies the non-facial image data and outputs fourth image data matching the non-facial area shielded by the VR HMD, and performing de-occlusion processing on the non-facial area shielded by the VR HMD according to the fourth image data.

Correspondingly to the embodiment of the processing method of image data as sated above, the present disclosure further provides an embodiment of a processing apparatus of image data.

Figure 3:
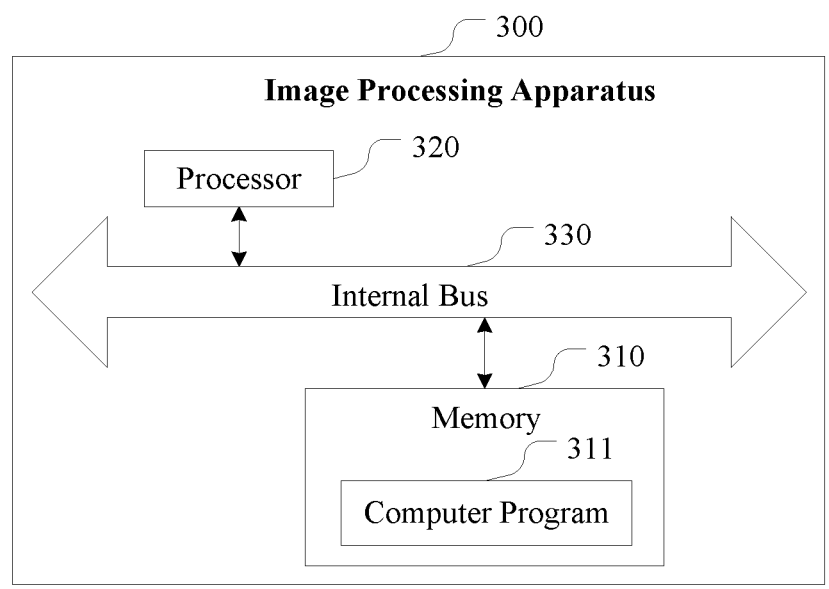
FIG. 3 is a schematic diagram of the functional structure of an image processing apparatus according to another embodiment of the present disclosure.

FIG. 3 is a schematic diagram of the structure of an image processing apparatus according to another embodiment of the present disclosure. As shown in FIG. 3, the image processing apparatus 300 comprises a memory 310 and a processor 320 that are communicatively connected by an internal bus 330. The memory 310 stores a computer program 311 for image processing that is executable by the processor 320, and when executed by the processor 320, the computer program 311 for image processing can implement the steps of the method as stated above.

In various embodiments, the memory 310 may be an internal memory or a non-volatile memory. The nonvolatile memory may be a storage drive (such as hard disk drive), a solid state disk, any type of memory disks (such as optical disk and DVD), or similar storage media, or a combination thereof. The internal memory may be an RAM (Radom Access Memory), a volatile memory, a nonvolatile memory and a flash memory. Further, the nonvolatile memory and the internal memory, as the machine-readable storage medium, can store the computer program 311 for image processing executed by the processor 320.

Figure 4:
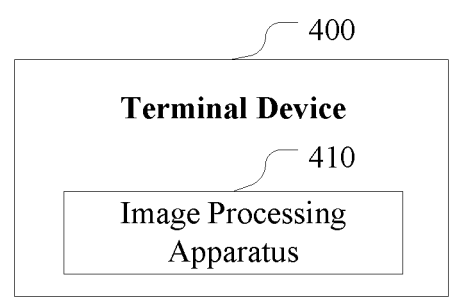
FIG. 4 is a schematic diagram of the functional structure of a terminal device according to an embodiment of the present disclosure.

FIG. 4 is a schematic diagram of the functional structure of a terminal device according to an embodiment of the present disclosure. As shown in FIG. 4, the terminal device 400 comprises an image processing apparatus 410 as shown in FIG. 2 or 3.

In an embodiment of the present disclosure, the terminal device 400 is a VR HMD. Alternatively, the terminal device 400 is a computer or a server that is connected to the VR HMD in the socializing process, and the composite image of a social participant may be sent to the other social participant through the computer or the server.

It should be noted that the embodiments of the apparatuses shown in FIG. 2 and FIG. 3 and the terminal device shown in FIG. 4 correspond to the embodiments of the method shown in FIG. 1 which have been described in detail above, so they will not be repeated here.

In sum, the advantageous effects of the technical solutions of the present disclosure are as follows. When an actual image of a specified target wearing a VR HMD is acquired, first, an area not shielded by the VR HMD and an area shielded by the VR HMD of the face of the specified target are identified from the actual image, and the first facial image data corresponding to the area not shielded by the VR HMD are input into the preset facial expression model, and thus the second facial image data matching the first facial image data are obtained; and then, the first facial image data and the second facial image data are fused to generate a composite image. Since the second facial image data correspond to the area shielded by the VR HMD and include facial expression information, the composite image is an integral image with facial expression information, so the social participating parties can obtain the facial expression information of the other social participant in time, thereby improving the socializing quality, ensuring a smooth process of socializing, and enhancing the user experience.

The above merely describes particular embodiments of the present disclosure. By the teaching of the present disclosure, a person skilled in the art can make other modifications or variations based on the above embodiments. A person skilled in the art should appreciate that, the detailed description above is only for the purpose of better explaining the present disclosure, and the protection scope of the present disclosure should be subject to the protection scope of the claims.

What is claimed is:

1. An image processing method, comprising:
    acquiring an actual image of a specified target from a video stream collected by a camera, wherein the specified target wears a virtual reality head-mounted device (VR HMD);
    identifying an area not shielded by the VR HMD and an area shielded by the VR HMD of the face of the specified target from the actual image, and acquiring first facial image data corresponding to the area not shielded by the VR HMD;
    obtaining second facial image data matching the first facial image data according to the first facial image data and a preset facial expression model, wherein the second facial image data correspond to the area shielded by the VR HMD; and
    fusing the first facial image data and the second facial image data to generate a composite image,
    wherein the step of obtaining second facial image data matching the first facial image data according to the first facial image data and a preset facial expression model comprises:
    inputting the first facial image data into the preset facial expression model so that the facial expression model identifies the first facial image data, and outputs the second facial image data matching the first facial image data,
    wherein the preset facial expression model is obtained by using a deep neural network, and the step of obtaining the preset facial expression model by using a deep neural network comprises:
    acquiring a plurality of first sample images of the specified target collected by the camera in a first scene, and a plurality of second sample images of the specified target collected in a second scene, wherein in the first scene, the specified target wears the VR HMD; and in the second scene, the specified target does not wear the VR HMD, and each of the second sample images contains a facial expression of the specified target;
    identifying a first shielded area from the first sample images, and acquiring information of the first shielded area;
    marking an area of the face of the specified target in the second sample images that is corresponding to the first shielded area according to the information of the first shielded area;
    placing images of the marked area in the second sample images into a first specified set that is used as an output set in deep neural network training, and placing images of the unmarked area of the face of the specified target in the second sample images into a second specified set that is used as an input set in the deep neural network training, wherein there is a one-to-one and input-output correspondence between image elements in the second specified set and image elements in the first specified set; and
    inputting, each pair of the image elements from the input set and the output set and having an input-output correspondence, into a preset deep neural network for training, determining a functional relation between an image of the unshielded area and an image of the shielded area that is generated to match the image of the unshielded area, so that when the first facial image data are inputted into the preset facial expression model, the preset facial expression model outputs the second facial image data matching the first facial image data according to the inputted first facial image data and the functional relation.

2. The image processing method according to claim 1, wherein in a process of the preset deep neural network training, a loss function of the preset deep neural network training is a mean square error between images in the output set and images generated to match the images in the input set.

3. The image processing method according to claim 1, further comprising:
    identifying a non-facial area shielded by the VR HMD from the actual image; and
    acquiring a plurality of third images before the actual image from the video stream, extracting a background image from the third images, and performing de-occlusion processing on the non-facial area shielded by the VR HMD by using image data corresponding to the non-facial area shielded by the VR HMD in the background image.

4. The image processing method according to claim 1, further comprising:
    identifying non-facial image data shielded by the VR HMD from the actual image, inputting the non-facial image data into a preset non-facial model, so that the preset non-facial model identifies the non-facial image data and outputs fourth image data matching the non-facial area shielded by the VR HMD, and performing de-occlusion processing on the non-facial area shielded by the VR HMD according to the fourth image data.

5. An image processing program stored in a memory of a computer and executed by a processor of the computer, the program comprising:
    a first acquiring module, for acquiring an actual image of a specified target from a video stream collected by a camera, wherein the specified target wears a virtual reality head-mounted device (VR HMD);
    an identifying module, for identifying an area not shielded by the VR HMD and an area shielded by the VR HMD of the face of the specified target from the actual image, and acquiring first facial image data corresponding to the area not shielded by the VR HMD;
    a second acquiring module, for obtaining second facial image data matching the first facial image data according to the first facial image data and a preset facial expression model, wherein the second facial image data correspond to the area shielded by the VR HMD; and
    a generating module, for fusing the first facial image data and the second facial image data to generate a composite image,
    wherein the second acquiring module is for inputting the first facial image data into the preset facial expression model so that the facial expression model identifies the first facial image data, and outputs the second facial image data matching the first facial image data, wherein the second acquiring module further comprises a training module, the training module is for obtaining the preset facial expression model by using a deep neural network, and the training module is further for:

acquiring a plurality of first sample images of the specified target collected by the camera in a first scene, and a plurality of second sample images of the specified target collected in a second scene, wherein in the first scene, the specified target wears the VR HMD; and in the second scene, the specified target does not wear the VR HMD, and each of the second sample images contains a facial expression of the specified target;

identifying a first shielded area from the first sample images, and acquiring information of the first shielded area;

marking an area of the face of the specified target in the second sample images that is corresponding to the first shielded area according to the information of the first shielded area;

placing images of the marked area in the second sample images into a first specified set that is used as an output set in deep neural network training, and placing images of the unmarked area of the face of the specified target in the second sample images into a second specified set that is used as an input set in the deep neural network training, wherein there is a one-to-one and input-output correspondence between image elements in the second specified set and image elements in the first specified set; and inputting, each pair of the image elements from the input set and the output set and having an input-output correspondence, into a preset deep neural network for training, determining a functional relation between an image of the unshielded area and an image of the shielded area that is generated to match the image of the unshielded area, so that the second acquiring module inputs the first facial image data into the preset facial expression model, and the preset facial expression model outputs the second facial image data matching the first facial image data according to the inputted first facial image data and the functional relation.

6. The image processing program according to claim 5, wherein in a process wherein the training module obtains the preset deep neural network training, a loss function of the preset deep neural network training is a mean square error between images in the output set and images generated to match the images in the input set.

7. The image processing program according to claim 5, further comprising:

a processing module, for identifying a non-facial area shielded by the VR HMD from the actual image; and acquiring a plurality of third images before the actual image from the video stream, extracting a background image from the third images, and performing de-occlusion processing on the non-facial area shielded by the VR HMD by using image data corresponding to the non-facial area shielded by the VR HMD in the background image.

8. The image processing program according to claim 5, further comprising:

a processing module, for identifying non-facial image data shielded by the VR HMD from the actual image, inputting the non-facial image data into a preset non-facial model, so that the preset non-facial model identifies the non-facial image data and outputs fourth image data matching the non-facial area shielded by the VR HMD, and performing de-occlusion processing on the non-facial area shielded by the VR HMD according to the fourth image data.

9. A terminal device comprising an image processing apparatus wherein the image processing apparatus comprises a memory and a processor that are communicatively connected by an internal bus; the memory stores a computer program for image processing that is executable by the processor, and when executed by the processor, the computer program for image processing can implement an image processing method as following:

acquiring an actual image of a specified target from a video stream collected by a camera, wherein the specified target wears a virtual reality head-mounted device (VR HMD);

identifying an area not shielded by the VR HMD and an area shielded by the VR HMD of the face of the specified target from the actual image, and acquiring first facial image data corresponding to the area not shielded by the VR HMD;

obtaining second facial image data matching the first facial image data according to the first facial image data and a preset facial expression model, wherein the second facial image data correspond to the area shielded by the VR HMD; and fusing the first facial image data and the second facial image data to generate a composite image, wherein the step of obtaining second facial image data matching the first facial image data according to the first facial image data and a preset facial expression model comprises:

inputting the first facial image data into the preset facial expression model so that the facial expression model identifies the first facial image data, and outputs the second facial image data matching the first facial image data, wherein the preset facial expression model is obtained by using a deep neural network, and the step of obtaining the preset facial expression model by using a deep neural network comprises:

acquiring a plurality of first sample images of the specified target collected by the camera in a first scene, and a plurality of second sample images of the specified target collected in a second scene, wherein in the first scene, the specified target wears the VR HMD; and in the second scene, the specified target does not wear the VR HMD, and each of the second sample images contains a facial expression of the specified target;

identifying a first shielded area from the first sample images, and acquiring information of the first shielded area;

marking an area of the face of the specified target in the second sample images that is corresponding to the first shielded area according to the information of the first shielded area;

placing images of the marked area in the second sample images into a first specified set that is used as an output set in deep neural network training, and placing images of the unmarked area of the face of the specified target in the second sample images into a second specified set that is used as an input set in the deep neural network training, wherein there is a one-to-one and input-output correspondence between image elements in the second specified set and image elements in the first specified set; and inputting, each pair of the image elements from the input set and the output set and having an input-output correspondence, into a preset deep neural network for training, determining a functional relation between an image of the unshielded area and an image of the shielded area that is generated to match the image of the unshielded area, so that when the first facial image data are inputted into the preset facial expression model, the preset facial expression model outputs the second facial image data matching the first facial image data according to the inputted first facial image data and the functional relation.

10. The terminal device according to claim 9, wherein in a process of the preset deep neural network training, a loss function of the preset deep neural network training is a mean square error between images in the output set and images generated to match the images in the input set.

11. The terminal device according to claim 9, further comprising:
identifying a non-facial area shielded by the VR HMD from the actual image; and acquiring a plurality of third images before the actual image from the video stream, extracting a background image from the third images, and performing de-occlusion processing on the non-facial area shielded by the VR HMD by using image data corresponding to the non-facial area shielded by the VR HMD in the background image.

12. The terminal device according to claim 9, further comprising:
identifying non-facial image data shielded by the VR HMD from the actual image, inputting the non-facial image data into a preset non-facial model, so that the preset non-facial model identifies the non-facial image data and outputs fourth image data matching the non-facial area shielded by the VR HMD, and performing de-occlusion processing on the non-facial area shielded by the VR HMD according to the fourth image data.

* * * * *